United States Patent
Ren et al.

(10) Patent No.: US 10,764,934 B2
(45) Date of Patent: Sep. 1, 2020

(54) METHOD, APPARATUS FOR TERMINAL DEVICE TO ACCESS WIRELESS NETWORK

(71) Applicant: Xiaomi Inc., Beijing (CN)

(72) Inventors: Qiao Ren, Beijing (CN); Enxing Hou, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 943 days.

(21) Appl. No.: 15/213,832

(22) Filed: Jul. 19, 2016

(65) Prior Publication Data

US 2016/0330776 A1 Nov. 10, 2016

Related U.S. Application Data

(63) Continuation of application No. PCT/CN2015/093301, filed on Oct. 30, 2015.

(30) Foreign Application Priority Data

Feb. 13, 2015 (CN) .......................... 2015 1 0080162

(51) Int. Cl.
*H04W 76/10* (2018.01)
*H04W 48/08* (2009.01)
(Continued)

(52) U.S. Cl.
CPC ........... *H04W 76/10* (2018.02); *H04W 12/10* (2013.01); *H04W 48/08* (2013.01); *H04W 48/16* (2013.01); *H04W 12/08* (2013.01); *H04W 84/12* (2013.01)

(58) Field of Classification Search
CPC ..... H04W 76/10; H04W 12/10; H04W 48/08; H04W 48/16; H04W 12/08; H04W 84/12
See application file for complete search history.

(56) References Cited

U.S. PATENT DOCUMENTS 9,451,464 B2 * 9/2016 Fan ................. H04W 12/08
2008/0165967 A1 * 7/2008 Ross ................. G06F 21/10
380/258

(Continued)

FOREIGN PATENT DOCUMENTS

CN 102685273 A 9/2012
CN 103686674 A 3/2014
(Continued)

OTHER PUBLICATIONS

Combined Chinese Office Action and Search Report dated Aug. 22, 2017 in Patent Application No. 201510080162.5 (with English translation of Categories of Cited Documents).

(Continued)

*Primary Examiner* — Andrew Lai
*Assistant Examiner* — Chuong M Nguyen
(74) *Attorney, Agent, or Firm* — Oblon, McClelland, Maier & Neustadt, L.L.P.

(57) ABSTRACT

The embodiments of the present disclosure provide a method and an apparatus for controlling a terminal device to access a wireless Local Area Network LAN. When a terminal device needs to connect to the wireless LAN, a smart terminal device firstly acquires first access information of the wireless LAN and validates whether the first access information is correct; and when the first access information is correct, the smart terminal device sends the first access information to the terminal device, such that the terminal device utilizes the first access information to access the wireless LAN. The method can ensure the first access information sent to the terminal device is correct, i.e., the terminal device can successfully access the wireless LAN by utilizing the first access information. Thereby, the method can improve the success rate of accessing the wireless LAN by the terminal device.

7 Claims, 9 Drawing Sheets

(51) Int. Cl.
*H04W 12/10* (2009.01)
*H04W 48/16* (2009.01)
*H04W 12/08* (2009.01)
*H04W 84/12* (2009.01)

(56) References Cited

U.S. PATENT DOCUMENTS

| | | | | |
|---|---|---|---|---|
| 2010/0037319 | A1* | 2/2010 | Steeves | G06F 21/78 726/23 |
| 2010/0205655 | A1* | 8/2010 | Mokuya | G06F 21/305 726/4 |
| 2012/0275443 | A1* | 11/2012 | Shpak | H04W 48/14 370/338 |
| 2013/0014232 | A1 | 1/2013 | Louboutin et al. | |
| 2013/0039213 | A1* | 2/2013 | Averbuch | H04L 67/125 370/254 |
| 2013/0058274 | A1* | 3/2013 | Scherzer | H04W 12/08 370/328 |
| 2013/0223361 | A1* | 8/2013 | Park | H04W 12/06 370/329 |
| 2013/0318581 | A1* | 11/2013 | Counterman | H04W 12/0609 726/7 |
| 2014/0003286 | A1 | 1/2014 | Estevez et al. | |
| 2014/0317714 | A1 | 10/2014 | Louboutin et al. | |
| 2014/0366105 | A1* | 12/2014 | Bradley | H04W 12/06 726/5 |
| 2015/0281175 | A1* | 10/2015 | Basalamah | H04L 61/35 370/241 |
| 2016/0241543 | A1* | 8/2016 | Jung | G06F 21/35 |

FOREIGN PATENT DOCUMENTS

| | | |
|---|---|---|
| CN | 103716161 A | 4/2014 |
| CN | 103716911 A | 4/2014 |
| CN | 203826705 U | 9/2014 |
| CN | 104080194 A | 10/2014 |
| CN | 104202799 A | 12/2014 |
| CN | 104301891 A | 1/2015 |
| CN | 104302014 A | 1/2015 |
| CN | 104410963 A | 3/2015 |
| CN | 104703252 A | 6/2015 |
| JP | 2012-142681 A | 7/2012 |
| JP | 2013-62786 A | 4/2013 |
| JP | 2013-530601 A | 7/2013 |
| JP | 2013-190864 A | 9/2013 |
| JP | 2014-17548 A | 1/2014 |
| JP | 2014-68320 A | 4/2014 |
| KR | 10-2013-0080487 A | 7/2013 |
| KR | 10-2014-0032262 A | 3/2014 |
| KR | 10-2015-0006289 A | 1/2015 |
| RU | 2007 138 936 A | 4/2009 |
| WO | WO 2013/006315 A1 | 1/2013 |

OTHER PUBLICATIONS

Extended European Search Report dated Aug. 18, 2017 in Patent Application No. 15843090.0.
Japanese Office Action dated Mar. 7, 2017 in Patent Application No. 2016-574330.
Korean Office Action dated Oct. 17, 2016 in Patent Application No. 10-2015-7035661.
Korean Office Action dated Feb. 13, 2017 in Patent Application No. 10-2015-7035661.
Combine Russian Federation Office Action and Search Report dated Jun. 28, 2017 in Patent Application No. 2016109177/08(014357) (with English translation).
Japanese Office Action dated Nov. 27, 2017 in Japanese Patent Application No. 2017-014455, 3 pages.
International Search Report dated Feb. 15, 2016 in WIPO Patent Application No. PCT/CN2015/093301.

* cited by examiner

METHOD, APPARATUS FOR TERMINAL DEVICE TO ACCESS WIRELESS NETWORK

CROSS-REFERENCE TO RELATED APPLICATIONS

This application is a continuation of International Application No. PCT/CN2015/093301, filed Oct. 30, 2015, which is based upon and claims priority to Chinese Patent Application CN201510080162.5, filed Feb. 13, 2015, the entire contents of which are incorporated herein by reference.

TECHNICAL FIELD

The present disclosure generally relates to technical field of wireless communication, and more particularly, to a method and an apparatus for a terminal device to access a wireless network.

BACKGROUND

With development of wireless network communication technology, more and more terminal devices can access the wireless Local Area Network (LAN) via the wireless network communication technology such as WIFI (Wireless-Fidelity).

The terminal device needs to utilize access information to access a corresponding wireless LAN, for example, the access information includes a SSID (Service Set Identifier) and a password. The terminal device finds a corresponding wireless LAN by utilizing the SSID, and if the wireless LAN is set with an access password, the terminal device also needs to enter a correct password and then accesses the wireless LAN. However, a part of the terminal devices, such as a WIFI smart socket, have no user interface. For such terminal devices, the user needs to use a smart terminal device having a user interface to enter the access information, and send the access information of the wireless LAN to the terminal device waiting to access the wireless LAN; in this way, the terminal device utilizes the access information to access the wireless LAN.

SUMMARY

The present disclosure provides methods and apparatuses for controlling a terminal device to access a wireless Local Area Network (LAN).

Aspects of the disclosure provide a method for controlling a terminal device to access a wireless Local Area Network (LAN). The method includes receiving, at a device, first access information of a wireless LAN, validating whether the first access information is correct, and when the first access information is correct, sending the first access information to a first terminal device to cause the first terminal device to utilize the first access information to access the wireless LAN.

To validate whether the first access information is correct, in an example, the method includes sending an access request to the wireless LAN using the first access information, the access request carrying the first access information, detecting whether a successful access response message is received and when the successful access response message is received, determining that the first access information is correct. In another example, the method includes detecting whether an access information list in the device comprises second access information that matches the first access information; and when the access information list comprises the second access information that matches the first access information, determining that the first access information is correct.

In another example, the method includes sending an access information forwarding request to a network device. The access information forwarding request carries the first access information. The network device parses the access information forwarding request to obtain the first access information and forwards the first access information to a second terminal device and the second terminal device detects whether the second terminal device comprises third access information that matches the first access information and sends a correct detection result to the network device when the second terminal device includes the third access information that matches the first access information, and the network device forwards the correct detection result. The method includes receiving the correct detection result sent by the network device; and determining that the first access information is correct.

To receive, at the device, the first access information of the wireless LAN, in an example, the method includes selecting one group of access information from an access information list stored at the device as the first access information. In another example, the method includes receiving access information inputted by a user as the first access information.

Aspects of the disclosure provide a method for controlling a first terminal device to access a wireless Local Area Network LAN. The method includes receiving at a network device, an access information forwarding request sent by a smart terminal device. The access information forwarding request carries first access information. The method further includes parsing the access information forwarding request to obtain the first access information and sending the first access information to a second terminal device to cause the second terminal device to detect whether the second terminal device comprises third access information that matches the first access information and send a correct detection result when the second terminal device includes the third access information that matches the first access information. Then the method includes receiving the correct detection result sent by the second terminal device and forwarding the correct detection result to the smart terminal device, wherein the smart terminal device sends the first access information to the first terminal device, and the first terminal device utilizes the first access information to access a wireless LAN.

Aspects of the disclosure provide a method for controlling a first terminal device to access a wireless Local Area Network LAN. The method includes receiving, at a second terminal device, first access information sent by a network device. The first access information is sent by a smart terminal device to the network device. Further, the method includes detecting whether access information stored at the second terminal device comprises third access information that matches the first access information, when the second terminal device includes the third access information that matches the first access information, generating a correct detection result, and sending the correct detection result to the network device. The network device sends the correct detection result to the smart terminal device, the smart terminal device sends the first access information to the first terminal device in response to the correct detection result, and the first terminal device accesses a wireless LAN according to the first access information.

Aspects of the disclosure provide a device that includes a processor, and a memory for storing instructions executable by the processor. The processor is configured to receive first access information of a wireless Local Area Network (LAN), validate whether the first access information is correct, and when the first access information is correct, and send the first access information to a first terminal device to cause the first terminal device to utilize the first access information to access the wireless LAN.

According to an aspect of the disclosure, the processor is configured to send an access request to the wireless LAN using the first access information, the access request carrying the first access information, detect whether a successful access response message is received and when the successful access response message is received, determine that the first access information is correct.

According to another aspect of the disclosure, the processor is configured to access an access information list stored in the device, detect whether the access information list comprises second access information that matches the first access information and when the access information list comprises the second access information that matches the first access information, determine that the first access information is correct.

According to another aspect of the disclosure, the processor is configured to send an access information forwarding request to a network device. The access information forwarding request carries the first access information. The network device parses the access information forwarding request to obtain the first access information, the network device forwards the first access information to a second terminal device, and the second terminal device detects whether the second terminal device comprises third access information that matches the first access information and sends a correct detection result when the second terminal device includes the third access information that matches the first access information, and the network device forwards the correct detection result to the device. Then, the processor is configured to detect whether the correct detection result is received, and when the correct detection result is received, determine that the first access information is correct.

In an example, the processor is configured t: select one group of access information from an access information list stored in the device as the first access information. In another example, the processor is configured to receive access information inputted by a user as the first access information.

Aspects of the disclosure provide a network device that includes a processor; and a memory for storing instructions executable by the processor. The processor is configured to receive an access information forwarding request sent by a smart terminal device that controls a first terminal device to access a wireless Local Area Network (LAN). The access information forwarding request carries first access information. The processor is configured to parse the access information forwarding request to obtain the first access information, send the first access information to a second terminal device to cause the second terminal device to detect whether the second terminal device comprises third access information same with the first access information, and send a correct detection result when the second terminal device includes the third access information that matches the first access information. Further, the processor is configured to receive the correct detection result, and send the correct detection result to the smart terminal device. The smart terminal device sends the first access information to the first terminal device, and the first terminal device utilizes the first access information to access the wireless LAN.

Aspects of the disclosure provide a terminal device that includes a processor; and a memory for storing instructions executable by the processor. The processor is configured to receive first access information sent by a network device. The first access information is sent by a smart terminal device to the network device. Then the process is configured to detect whether the terminal device stores access information that matches the first access information, when the access information stored in the terminal device matches the first access information, generate a correct detection result, and send the correct detection result to the network device. The network device sends the correct detection result to the smart terminal device, the smart terminal device sends the first access information to another terminal device in response to the correct detection result, and the other terminal device accesses a wireless Local Area Network (LAN) according to the first access information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

With development of the wireless LAN technology, more and more terminal devices are capable of accessing the wireless LAN, so as to achieve the remote control to the terminal devices by smart terminals. For example, after a WIFI smart socket accesses a WIFI network, the user may remotely control ON and OFF of the WIFI smart socket via a smart mobile phone, so as to achieve the control of operation states of home appliances connected to the WIFI smart socket via the smart mobile phone.

Before accessing the WIFI network, the WIFI smart socket is in a monitoring status and is capable of monitoring messages sent by other devices. Thereby, it is possible to send access information of a designated wireless LAN (such as a SSID and a password of the wireless LAN) to the WIFI smart socket by a smart terminal device, and then the WIFI smart socket accesses the wireless LAN according to the received access information.

Figure 1:
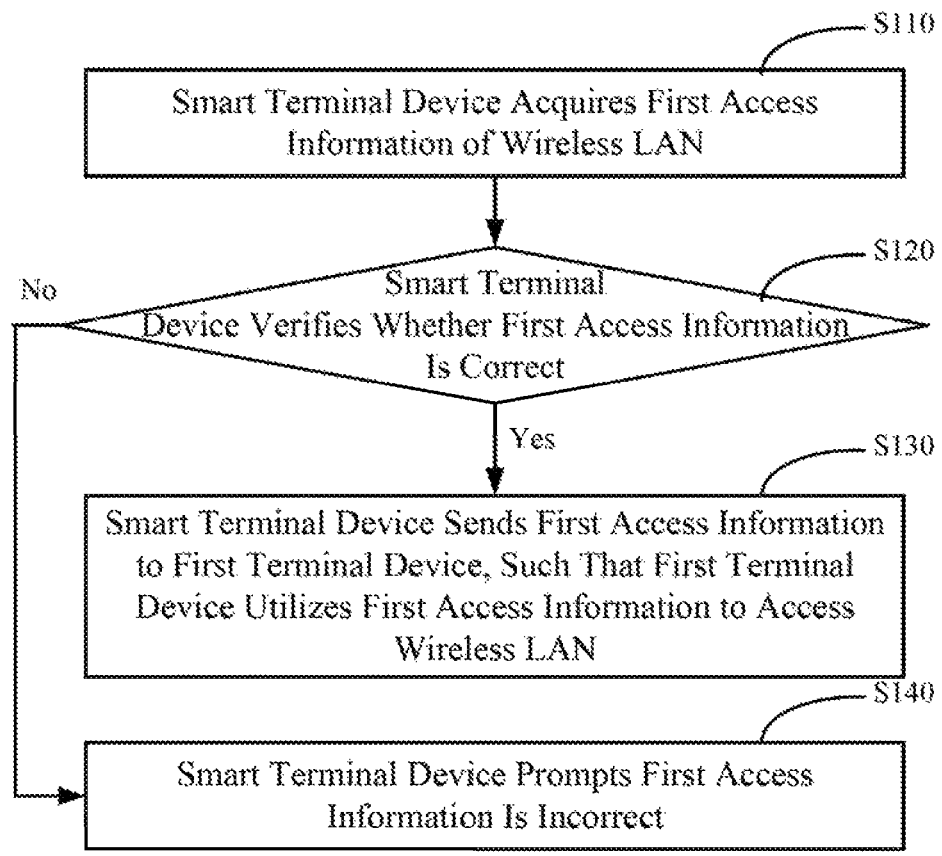
FIG. 1 is a flow chart of a method for controlling a terminal device to access a wireless LAN, according to an exemplary embodiment.

FIG. 1 is a flow chart of a method for controlling a terminal device to access a wireless LAN, according to an exemplary embodiment. The method is used in a smart terminal device. As shown in FIG. 1, the method includes the following methods.

In step S110, a smart terminal device acquires first access information of a wireless LAN.

The smart terminal device may be a smart mobile phone, a tablet computer, and the like. In general, the access information of the wireless LAN at least includes a SSID and a password corresponding to the wireless LAN.

In one exemplary embodiment of the present disclosure, the smart terminal device may save the access information which can be used to access the wireless LAN successfully. Thereby, the smart terminal device may select one group of SSID and password from an access information list of the wireless LAN saved by itself as the first access information.

In another exemplary embodiment of the present disclosure, the user may input a SSID and a password of the wireless LAN on a user interface of the smart terminal device, then the smart terminal device receives the SSID and password inputted by the user, and uses the SSID and password as the first access information.

In step S120, the smart terminal device validates whether the first access information is correct. If determining that the first access information is correct, step S130 is performed; and if determining that the first access information is incorrect, step S140 is performed.

The smart terminal device validates whether the SSID in the first access information is correct, and if the wireless LAN is provided with a password, it is also necessary to validate whether the password in the first access information is correct. When both the SSID and the password are correct, it can be determined that the first access information is correct.

In step S130, the smart terminal device sends the first access information to a first terminal device, such that the first terminal device utilizes the first access information to access the wireless LAN.

Only after determining that the first access information is correct, the smart terminal device sends the first access information to the first terminal device, in this way, the first terminal device, after receiving the first access information, sends an access request to a network device corresponding to the first access information, then after the network device receives the access request and the validation is successful, a communication connection is established between the network device and the first terminal device.

In step S140, the smart terminal device prompts that the first access information is incorrect.

The smart terminal device may prompt the user via prompt information that the first access information is incorrect, wherein the prompt information may be at least one of text information and voice information. The user may reinput one group of access information, or reselect one group of access information according to the prompt information as the first access information.

In the method for controlling a terminal device to access a wireless LAN, when a first terminal device needs to connect to the wireless LAN, a smart terminal device firstly acquires first access information of the wireless LAN, and validates whether the first access information is correct, only when determining that the first access information is correct, the smart terminal device sends the first access information to the first terminal device, then the first terminal device utilizes the first access information to access the wireless LAN. From above, the method can ensure the first access information sent to the terminal device to be correct, i.e., the first terminal device can always successfully access the wireless LAN by utilizing the first access information. Thereby, the method may improve the success rate of accessing the wireless LAN by the terminal device.

Figure 2:
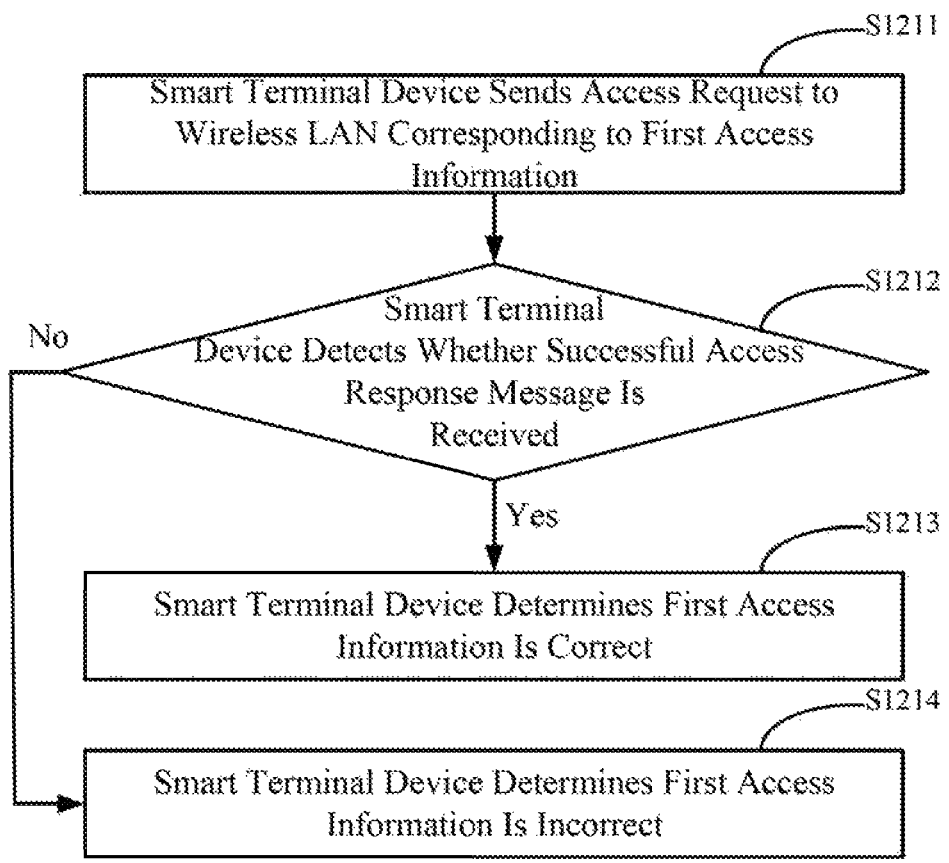
FIG. 2 is a flow chart of one method of step S120, according to an exemplary embodiment.

FIG. 2 is a flow chart of one method of step S120, according to an exemplary embodiment. As shown in FIG. 2, the step S120 in FIG. 1 may include the following steps.

In step S1211, the smart terminal device sends an access request to a wireless LAN corresponding to the first access information, the access request at least carrying the first access information.

In step S1212, the smart terminal device detects whether a successful access response message is received. If receiving the successful access response message, step S1213 is performed; otherwise, step S1214 is performed.

In step S1213, the smart terminal device determines the first access information is correct.

In step S1214, the smart terminal device determines the first access information is incorrect.

In the method for controlling a terminal device to access a wireless LAN, the smart terminal device utilizes the first access information to connect to a corresponding wireless LAN. If the smart terminal device accesses the wireless LAN successfully, it is determined that the first access information is correct; and if the connection fails, it is determined that the first access information is incorrect. Such validating method can accurately determine the accuracy of the first access information.

Figure 3:
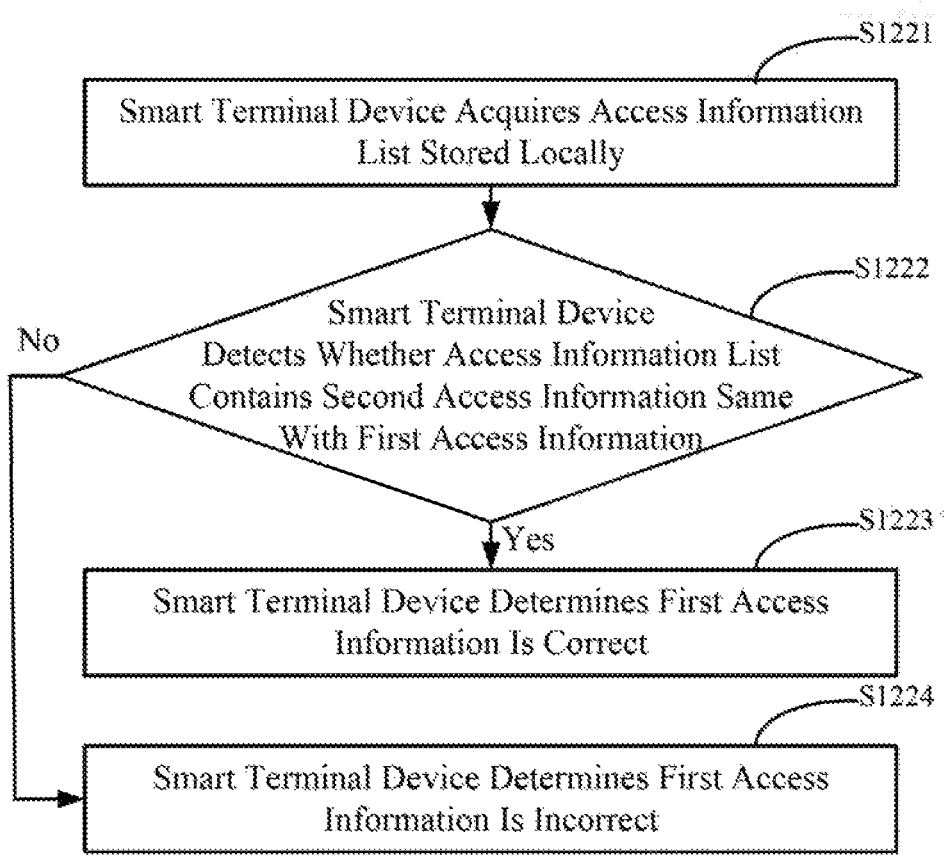
FIG. 3 is a flow chart of another method of step S120, according to an exemplary embodiment.

FIG. 3 is a flow chart of another method of step S120, according to an exemplary embodiment. The method is adaptable for a scene in which the first access information is obtained by the user input. As shown in FIG. 3, the step S120 may include the following steps.

In step S1221, a smart terminal device acquires an access information list stored locally.

When the smart terminal device successfully accesses a certain wireless LAN, the smart terminal device will save the access information of this wireless LAN in a local access information list, in this way, all the access information of the wireless LANs to which the smart terminal device is successfully connected can be saved in the access information list.

In step S1222, the smart terminal device detects whether the access information list contains second access information same with the first access information. If the access information list contains the second access information same with the first access information, step S1223 is performed; and if the access information list does not contain the second access information same with the first access information, step S1224 is performed.

The access information of the wireless LAN generally includes a SSID and a password of the wireless LAN. Thereby, when detecting whether the access information list contains second access information same with the first access information, it is possible to firstly detect whether the access information list contains the SSID in the first access information, if yes, then further to judge whether the password corresponding to the SSID in the access information list is consistent with the password inputted by the user, and if they are consistent, then it is believed that the access information list contains second access information same with the first access information.

In step S1223, the smart terminal device determines that the first access information is correct.

In step S1224, the smart terminal device determines the first access information is incorrect.

In an illustrative embodiment of the present disclosure, the smart terminal device stores therein access information of all the wireless LANs in the current environment. For example, the smart terminal device may generally save the access information of all the wireless LANs in the user's home. In such scene, if the access information list does not contain second access information same with the first access information, it is determined that the first access information is incorrect. If a difference exists in at least one of the SSID and the password, it is determined that the first access information is incorrect.

In another illustrative embodiment of the present disclosure, not all the access information of all the wireless LANs in the current environment are stored in the smart terminal device. In such scene, if the access information list does not contain the first access information, it is unable to directly determine that the first access information is incorrect, and the method shown in FIG. 2 may be further adopted to determine whether the first access information is correct.

The method for validating the access information provided by the present embodiment validates whether the first access information is correct directly according to the access information list saved locally in the smart terminal device. This manner does not need the smart terminal device to connect to the wireless LAN corresponding to the first access information, which saves time required by validating the access information, and thus improves a rate of validation and reduces waiting time of the first terminal device.

Figure 4:
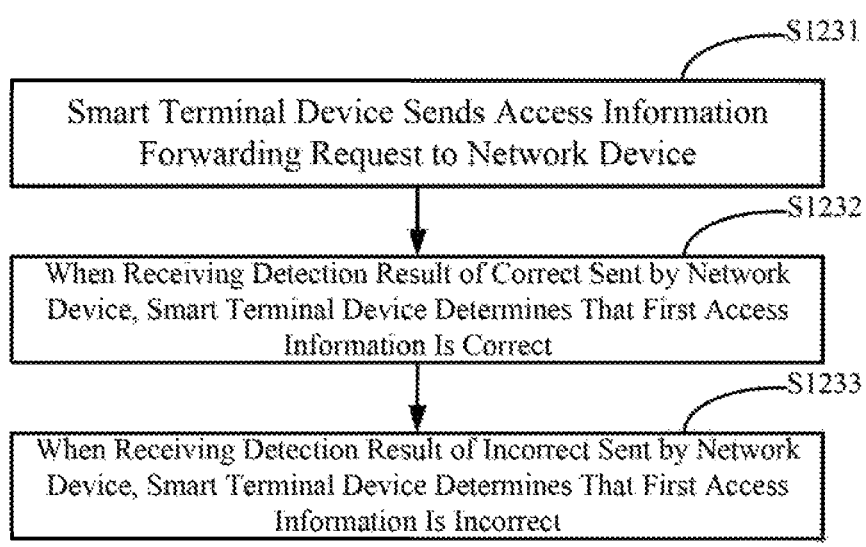
FIG. 4 is a flow chart of a yet another method of step S120, according to an exemplary embodiment.

FIG. 4 is a flow chart of a yet another method of step S120, according to an exemplary embodiment.

This method validates whether the first access information is correct via other terminal device. For example, assuming that the first terminal device is a smart socket, the second terminal device is a smart camera, the network device is a router, and the smart terminal device is a smart mobile phone, then the smart mobile phone sends the obtained first access information to the smart camera via the router, the smart camera judges whether the first access information is correct, and then the router feeds the detection result to the smart terminal device.

As shown in FIG. 4, the method may include the following steps.

In step S1231, a smart terminal device sends an access information forwarding request to a network device. The access information forwarding request at least carries the first access information.

The network device parses the access information forwarding request to obtain the first access information, and forwards the first access information to a second terminal device having accessed the network device. After obtaining the first access information by parsing, the network device may broadcast message carrying the first access information to the second terminal device having accessed the network device, such that the second terminal device receives the first access information, and detects whether the second terminal device contains third access information same with the first access information so as to obtain a detection result.

The access information generally includes a SSID and a password of the wireless LAN. Thereby, when detecting whether the first access information is correct, it is needed to detect whether the SSID and the password are correct. The second terminal device may save the access information of the accessed wireless LAN. The second terminal device firstly judge whether the third access information contains a same SSID as that in the first access information, if yes, then judge whether the password corresponding to this SSID in the third access information is the same as that m the first access information. If they are the same, then the detection result of correct is obtained. If at least one item of the SSID and the password is different, then the detection result of incorrect is obtained. The second terminal device sends the detection result to the network device, and then the network device forwards it to the smart terminal device.

In step S1232, when receiving the detection result of correct sent by the network device, the smart terminal device determines that the first access information is correct.

In step S1233, when receiving the detection result of incorrect sent by the network device, the smart terminal device determines that the first access information is incorrect.

In an illustrative embodiment of the present disclosure, the second terminal device stores therein access information of all the wireless LANs in the current environment. For example, the second terminal device may generally save the access information of all the wireless LANs in the user's home. In such scene, if the second terminal device does not contain second access information same with the first access information, it is determined that the first access information is incorrect. For example, if at least one item of the SSID and the password is different, it is determined that the first access information is incorrect.

In another illustrative embodiment of the present disclosure, not all the access information of all the wireless LANs in the current environment are stored in the second terminal device. In such scene, if the second terminal device does not contain the first access information, it is unable to directly determine that the first access information is incorrect, and the method shown in FIG. 2 may be further adopted to determine whether the first access information is correct.

It should be noted, the execution sequence of the steps S1232 and S1233 are not limited in the embodiments of the present disclosure.

The method for validating the first access information provided by the present embodiment sends, via the network device, the first access information to other terminal device which accesses the network device, and whether the first access information is correct is judged by other terminal device, without judgment by the smart terminal device. In this way, the process of judging whether the first access information is correct will not occupy CPU resource of the smart terminal device, thereby reducing the CPU resource occupancy rate of the smart terminal device.

Corresponding to the method embodiment shown in FIG. 4, the present disclosure also provides a method embodiment applicable in the network device and a method embodiment applicable in the second terminal device.

Figure 5:
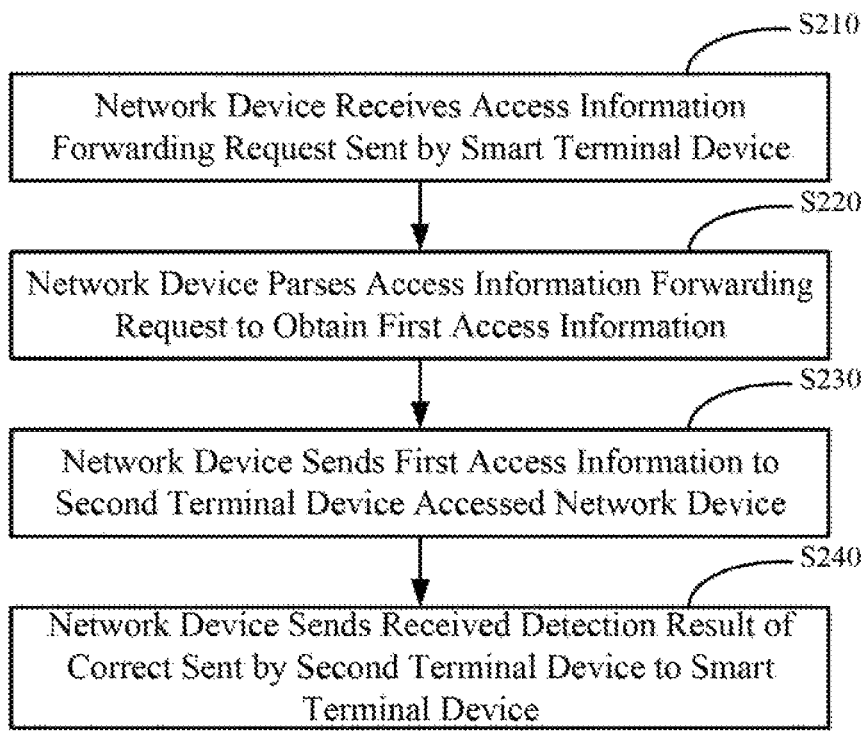
FIG. 5 is a flow chart of a method for controlling a terminal device to access a wireless LAN, according to an exemplary embodiment.

FIG. 5 is a flow chart of a method for controlling a terminal device to access a wireless LAN, according to an exemplary embodiment. The method is applied in a network device, such as a router. As shown in FIG. 5, the method may include the following steps.

In step S210, a network device receives an access information forwarding request sent by a smart terminal device, the access information forwarding request at least carrying the first access information.

In step S220, the network device parses the access information forwarding request to obtain the first access information.

In step S230, the network device sends the first access information to a second terminal device accessed the network device, such that the second terminal device detects whether the second terminal device contains third access information same with the first access information.

After obtaining the first access information by parsing, the network device may broadcast a message carrying the first access information.

In step S240, the network device sends the received correct detection result sent by the second terminal device to the smart terminal device, such that the smart terminal device sends the first access information to the first terminal device, and the first terminal device utilizes the first access information to access the wireless LAN.

The correct detection result is generated when the second terminal device detects that the second terminal device contains third access information same with the first access information.

After receiving the first access information, the second terminal device detects whether third access information same with the first access information is saved locally, if there is the third access information same with the first access information, a correct detection result is obtained, and if there is no third access information same with the first access information, an incorrect detection result is obtained. The detection result obtained by the second terminal device is returned to the network device, then the network device forwards it to the smart terminal device.

The smart terminal device determines whether the first access information is correct according to the received detection result. If receiving the correct detection result, it is determined that the first access information is correct, and the first access information is sent to the first terminal device. The first terminal device accesses the wireless LAN according to the first access information. If receiving the incorrect detection result, it is determined that the access information is incorrect, and it is possible to prompt the user that the first access information is incorrect.

In the method for controlling the terminal device to access the wireless LAN provided by the present embodiment, the first access information is sent via the network device to other terminal device accessed the network device, then other terminal device judges whether the first access information is correct, without judgment by the smart terminal device. In this way, the process of judging whether the first access information is correct will not occupy CPU resource of the smart terminal device, thereby reducing the CPU resource occupancy rate of the smart terminal device.

Figure 6:
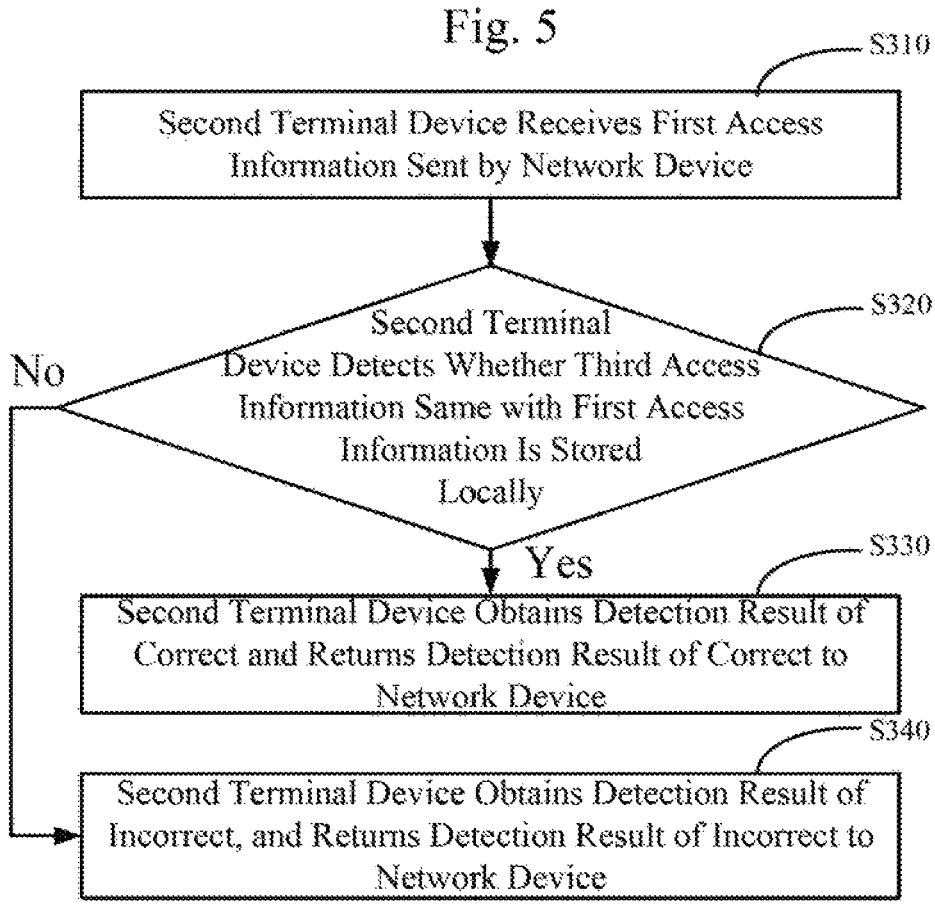
FIG. 6 is a flow chart of another method for controlling a terminal device to access a wireless LAN, according to an exemplary embodiment.

FIG. 6 is a flow chart of another method for controlling a terminal device to access a wireless LAN, according to an exemplary embodiment. The method is applied to the second terminal device, such as a smart camera. As shown in FIG. 6, the method may include the following steps.

In step S310, a second terminal device receives first access information sent by a network device, the first access information being sent to the network device by a smart terminal device.

In step S320, the second terminal device detects whether third access information same with the first access information is stored locally; if there is the third access information same with the first access information stored locally, step S330 is performed; and if there is no third access information same with the first access information stored locally, step S340 is performed.

The second terminal device may save access information of successfully connected wireless LANs, thereby, may judge whether the received first access information is correct according to the access information stored locally.

In step S330, the second terminal device obtains a correct detection result and returns the correct detection result to the network device. The network device sends the correct detection result to the smart terminal device, then the smart terminal device sends the first access information to the first terminal device, and finally, the first terminal device accesses the wireless LAN according to the first access information.

After receiving the first access information, the second terminal device detects whether third access information same with the first access information is stored locally, if there is the third access information same with the first access information, a correct detection result is obtained; and if there is no the third access information same with the first access information, an incorrect detection result is obtained. The detection result obtained by the second terminal device is returned to the network device, and then the network device forwards it to the smart terminal device.

In step S340, the second terminal device obtains the incorrect detection result, and returns the incorrect detection result to the network device. The network device sends the incorrect detection result to the smart terminal device, and then the smart terminal device determines that the first access information is incorrect according to the incorrect detection result, and prompts the user that the first access information is error.

In the method for controlling a terminal device to access a wireless LAN provided by the present embodiment, the first access information is sent via the network device to other terminal device accessed the network device, then other terminal device judges whether the first access information is correct, without judgment by the smart terminal device. In this way, the process of judging whether the first access information is correct will not occupy CPU resource of the smart terminal device, thereby reducing the CPU resource occupancy rate of the smart terminal device.

Figure 7:
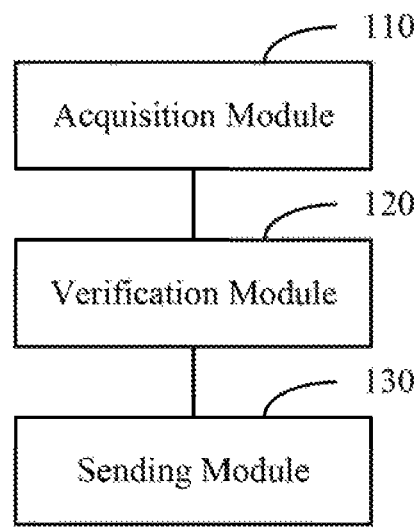
FIG. 7 is a block diagram illustrating an apparatus for controlling a terminal device to access a wireless LAN, according to an exemplary embodiment.

FIG. 7 is a block diagram illustrating an apparatus for controlling a terminal device to access a wireless LAN, according to an exemplary embodiment. The apparatus is applied in a smart terminal device, such as a smart mobile phone, and a tablet computer. As shown in FIG. 7, the apparatus may include an acquisition module 110, a validation module 120 and a sending module 130.

The acquisition module 110 is configured to acquire first access information of the wireless LAN.

In general, the access information of the wireless LAN at least includes a SSID and a password corresponding to the wireless LAN.

In one illustrative embodiment of the present disclosure, the acquisition module includes a selection submodule, which is configured to select one group of access information from an access information list stored locally in the smart terminal device as the first access information.

In another illustrative embodiment of the present disclosure, the acquisition module includes a receiving submodule, which is configured to receive access information inputted by a user as the first access information. The user may input the SSID and the password of the wireless LAN on a user interface of the smart terminal device, then the acquisition module receives the SSID and the password inputted by the user and uses the SSID and the password as the first access information.

The validation module 120 is configured to validate whether the first access information is correct.

The sending module 130 is configured to, if determining that the first access information is correct, send the access information to a first terminal device such that the first terminal device utilizes the first access information to access the wireless LAN.

In the apparatus for controlling a terminal device to access a wireless LAN provided the present embodiment, when a first terminal device needs to connect to the wireless LAN, a smart terminal device firstly acquires first access information of the wireless LAN and validates whether the first access information is correct, and only when determining that the first access information is correct, the smart terminal device sends the first access information to the first terminal device, such that the first terminal device utilizes the first access information to access the wireless LAN. From above, the method can ensure the first access information sent to the first terminal device to be accurate, i.e., the first terminal device can always successfully access the wireless LAN by utilizing the first access information. Thereby, the method may improve the success rate of accessing the wireless LAN by the terminal device.

Figure 8:
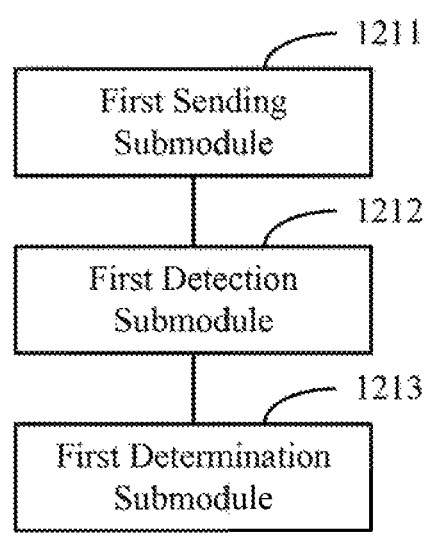
FIG. 8 is a block diagram illustrating a validation module, according to an exemplary embodiment.

FIG. 8 is a block diagram illustrating a validation module, according to an exemplary embodiment. As shown in FIG. 8, the validation module includes: a first sending submodule 1211, a first detection submodule 1212 and a first determination submodule 1213.

The first sending submodule 1211 is configured to send an access request to a wireless LAN corresponding to the first access information, the access request at least carrying the first access information.

The first detection submodule 1212 is configured to detect whether a successful access response message is received.

The first determination submodule 1213 is configured to, if receiving the successful access response message, determine that the first access information is correct.

In the validation module provided by the illustrative embodiment, the smart terminal device connects to a corresponding wireless LAN by utilizing the first access information, if the smart terminal device successfully accesses the wireless LAN, it is determined that the first access information is correct; and if the connection fails, it is determined that the first access information is wrong. Such validating method can accurately determine the accuracy of the first access information.

Figure 9:
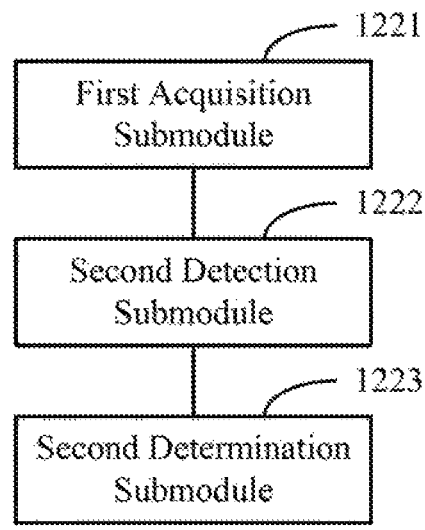
FIG. 9 is a block diagram illustrating another validation module, according to an exemplary embodiment.

FIG. 9 is a block diagram illustrating another validation module, according to an exemplary embodiment. As shown in FIG. 9, the validation module includes: a first acquisition submodule 1221, a second detection submodule 1222, and a second determination submodule 1223.

The first acquisition submodule 1221 is configured to acquire an access information list stored locally.

The second detection submodule 1222 is configured to detect whether the access information list includes second access information same with the first access information.

The second determination submodule 1223 is configured to, if the access information list includes the second access information same with the first access information, determine that the first access information is correct.

The method for validating the access information provided by the present embodiment validates whether the first access information is correct directly according to the access information list saved locally in the smart terminal device. This manner does not need the smart terminal device to connect to the wireless LAN corresponding to the first access information, which saves time required by validating the access information, and thus improves a rate of validation and reduces waiting time of the first terminal device.

Figure 10:
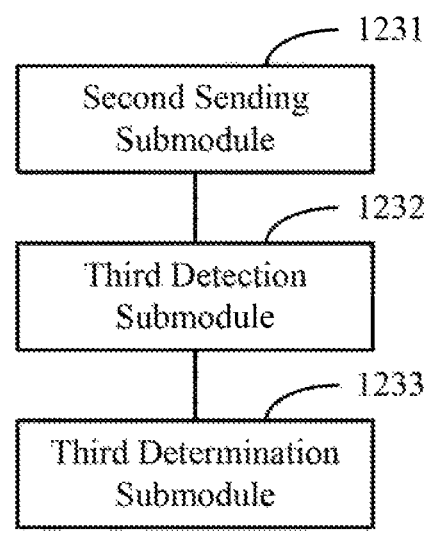
FIG. 10 is a block diagram illustrating a yet another validation module, according to an exemplary embodiment.

FIG. 10 is a block diagram illustrating a yet another validation module, according to an exemplary embodiment. As shown in FIG. 10, the validation module includes: a second sending submodule 1231, a third detection submodule 1232, and a third determination submodule 1233.

The second sending submodule 1231 is configured to send an access information forwarding request to a network device, the access information forwarding request at least carrying the first access information, such that the network device parses the access information forwarding request to obtain the first access information, the network device forwards the first access information to a second terminal device having accessed the network device, and the second terminal device detects whether the second terminal device includes third access information same with the first access information.

The third detection submodule 1232 is configured to detect whether a correct detection result is received.

The third determination submodule 1233 is configured to, when receiving the correct detection result sent by the network device, determine that the first access information is correct, the correct detection result being sent by the second terminal device to the network device when detecting that the second terminal device includes the third access information same with the first access information.

The validation module provided by the present embodiment sends, via the network device, the first access information to other terminal device which accesses the network device, and whether the first access information is correct is judged by other terminal device, which needs no judgment by the smart terminal device. In this way, the process of judging whether the first access information is correct will not occupy CPU resource of the smart terminal device, thereby reducing the CPU resource occupancy rate of the smart terminal device.

Figure 11:
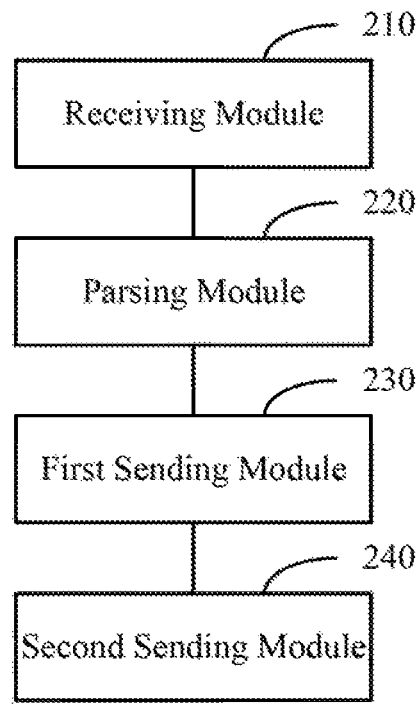
FIG. 11 is a block diagram illustrating an apparatus for controlling a terminal device to access a wireless LAN, according to an exemplary embodiment.

FIG. 11 is a block diagram illustrating an apparatus for controlling a terminal device to access a wireless LAN, according to an exemplary embodiment. The apparatus is applied in the network device. As shown in FIG. 11, the apparatus may include a receiving module 210, a parsing module 220, a first sending module 230, and a second sending module 240.

The receiving module 210 is configured to receive an access information forwarding request sent by a smart terminal device, the access information forwarding request at least carrying first access information.

The parsing module 220 is configured to parse the access information forwarding request to obtain the first access information.

The first sending module 230 is configured to send the first access information to a second terminal device, such that the second terminal device detects whether the second terminal device includes third access information same with the first access information.

The second sending module 240 is configured to send a correct detection result sent by the second terminal device to the smart terminal device, such that the smart terminal device sends the first access information to the first terminal device, and the first terminal device utilizes the first access information to access the wireless LAN, the correct detection result being generated by the second terminal device when detecting that the second terminal device includes the third access information same with the first access information.

In the apparatus for controlling the terminal device to access the wireless LAN provided by the present embodiment, the first access information is sent via the network device to other terminal device accessed the network device, then other terminal device judges whether the first access information is correct, without judgment by the smart terminal device. In this way, the process of judging whether the first access information is correct will not occupy CPU resource of the smart terminal device, thereby reducing the CPU resource occupancy rate of the smart terminal device.

Figure 12:
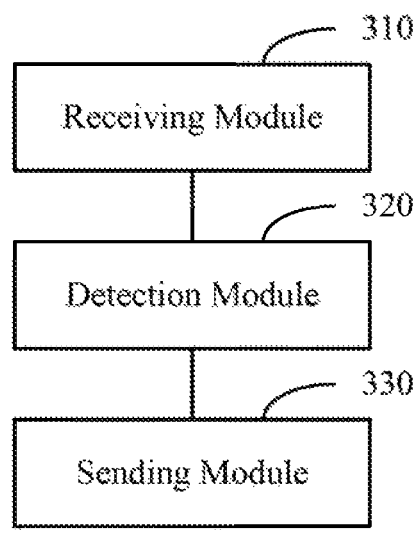
FIG. 12 is a block diagram illustrating another apparatus for controlling a terminal device to access a wireless LAN, according to an exemplary embodiment.

FIG. 12 is a block diagram illustrating another apparatus for controlling a terminal device to access a wireless LAN, according to an exemplary embodiment. The apparatus is applied in a second terminal device. As shown in FIG. 12, the apparatus may include: a receiving module 310, a detection module 320, and a sending module 330.

The receiving module 310 is configured to receive first access information sent by a network device, the first access information being sent by a smart terminal device to the network device.

The detection module 320 is configured to detect whether access information stored locally includes third access information same with the first access information, and if the third access information same with the first access information is stored locally, obtain a correct detection result.

The sending module 330 is configured to send the correct detection result to the network device, such that the network device sends the correct detection result to the smart terminal device, the smart terminal device sends the first access information to a first terminal device, and the first terminal device accesses the wireless LAN according to the first access information.

In the apparatus for controlling the terminal device to access the wireless LAN provided by the present embodiment, the first access information is sent via the network device to other terminal device accessed the network device, then other terminal device judges whether the first access information is correct, without judgment by the smart terminal device. In this way, the process of judging whether the first access information is correct will not occupy CPU resource of the smart terminal device, thereby reducing the CPU resource occupancy rate of the smart terminal device.

With respect to the devices in the above embodiments, the specific manners for performing operations for individual modules therein have been described in detail in the embodiments regarding the methods, which will not be elaborated herein.

Figure 13:
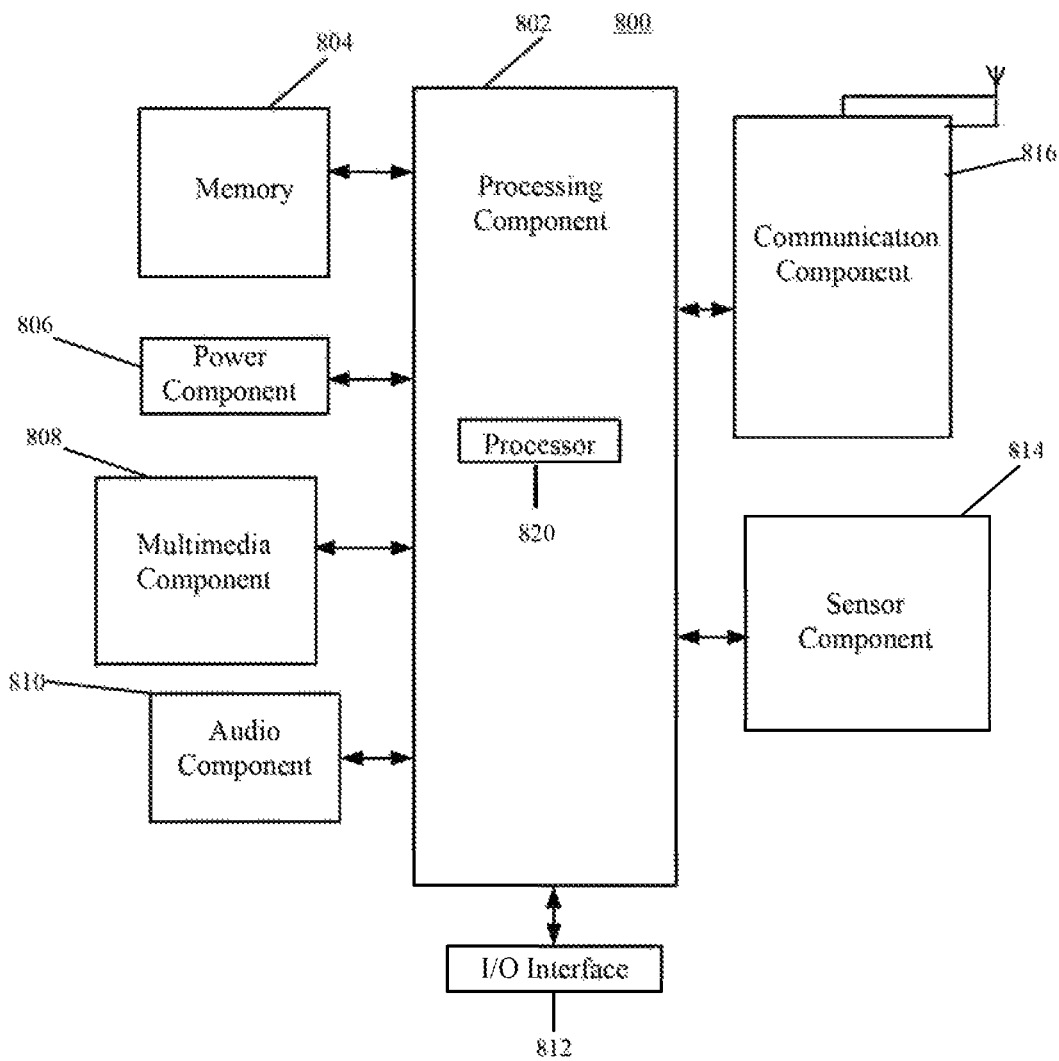
FIG. 13 is a block diagram illustrating a device for controlling a terminal device to access a wireless LAN, according to an exemplary embodiment.

FIG. 13 is a block diagram of a device 800 for controlling a terminal device to access a wireless LAN, according to an exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 13, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium is executed by a processor of the mobile terminal, enables the terminal device to perform the method for controlling a terminal device to access a wireless LAN, the method including:

acquiring first access information of the wireless LAN;

validating whether the first access information is correct; and if determining that the first access information is correct, sending the access information to a first terminal device, such that the first terminal device accesses the wireless LAN by utilizing the first access information.

Figure 14:
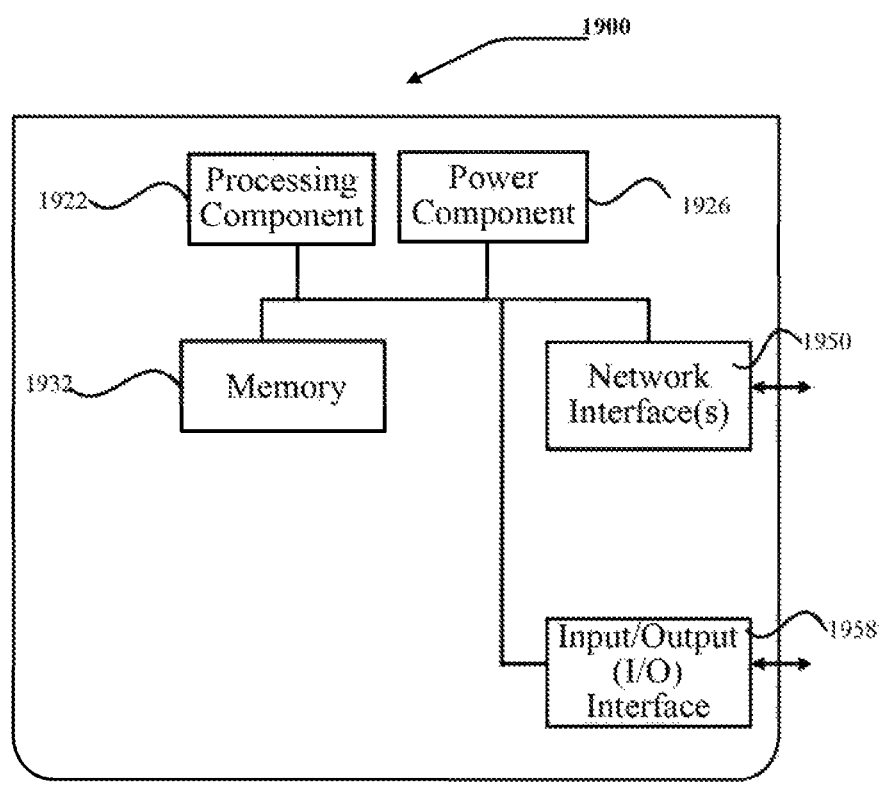
FIG. 14 is a block diagram illustrating a device for controlling a terminal device to access a wireless LAN, according to an exemplary embodiment.

FIG. 14 is a block diagram of a device 1900 for controlling a terminal device to access a wireless LAN, according to an exemplary embodiment. For example, the device 1900 may be provided as a server. Referring to FIG. 14, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. Further, the processing component 1922 is configured to execute the instructions to perform the following method:

receiving an access information forwarding request sent by a smart terminal device, the access information forwarding request at least carrying first access information;

parsing the access information forwarding request to obtain the first access information;

sending the first access information to a second terminal device, such that the second terminal device detects whether the second terminal device comprises third access information same with the first access information; and sending a correct detection result sent by the second terminal device to the smart terminal device, such that the smart terminal device sends the first access information to the first terminal device, and the first terminal device utilizes the first access information to access the wireless LAN, the correct detection result being generated by the second terminal device when detecting that the second terminal device includes the third access information same with the first access information.

The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux™, FreeBSD™, or the like.

In the other hand, the present disclosure also provides a terminal device, such as devices like smart sockets and smart cameras capable of connecting to the wireless LAN, the terminal device includes a processor; and a memory for storing instructions executable by the processor; wherein the processor is configured to:

receive first access information sent by a network device, the first access information being sent by a smart terminal device to the network device;

detect whether third access information same with the first access information is stored locally;

if the third access information same with the first access information is stored locally, obtain a correct detection result; and send the correct detection result to the network device, such that the network device sends the correct detection result to the smart terminal device, the smart terminal device sends the first access information to a first terminal device according to the correct detection result, and the first terminal device accesses the wireless LAN according to the first access information.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a first terminal device to access a wireless Local Area Network (LAN), comprising:
    receiving, at a smart terminal device, first access information of the wireless LAN;
    validating, by the smart terminal device, whether the first access information is correct by:
        sending an access information forwarding request to a network device, the access information forwarding request carrying the first access information, wherein the network device parses the access information forwarding request to obtain the first access information and forwards the first access information to a second terminal device and the second terminal device detects whether the second terminal device acquires second third access information that matches the first access information and sends a correct detection result to the network device when the second terminal device is detected to acquire the second third access information that matches the first access information, and the network device forwards the correct detection result to the smart terminal device;
        receiving the correct detection result sent by the network device; and
        determining that the first access information is correct; and
    when the first access information is determined to be correct, sending, by the smart terminal device, the first access information to the first terminal device to cause the first terminal device to utilize the first access information to access the wireless LAN.

2. The method of claim 1, wherein receiving, at the smart terminal device, the first access information of the wireless LAN comprises:
    selecting one group of access information from an access information list stored at the smart terminal device as the first access information.

3. The method of claim 1, wherein receiving, at the smart terminal device, the first access information of the wireless LAN comprises:
    receiving access information inputted by a user as the first access information.

4. A method for controlling a first terminal device to access a wireless Local Area Network (LAN), comprising:
    receiving, at a network device, an access information forwarding request sent by a smart terminal device, the access information forwarding request carrying first access information;
    parsing, by the network device, the access information forwarding request to obtain the first access information;
    sending, by the network device, the first access information to a second terminal device to cause the second terminal device to detect whether the second terminal device acquires second third access information that matches the first access information and send a correct detection result when the second terminal device is detected to acquire the second third access information that matches the first access information;
    receiving, by the network device, the correct detection result sent by the second terminal device; and
    forwarding, by the network device, the correct detection result to the smart terminal device, wherein the smart terminal device sends the first access information to the first terminal device, and the first terminal device utilizes the first access information to access a wireless LAN.

5. A device, comprising:
    a processor; and
    a memory for storing instructions executable by the processor;
    wherein the processor is configured to:
        receive first access information of a wireless Local Area Network (LAN);
        validate whether the first access information is correct by:
            sending an access information forwarding request to a network device, the access information forwarding request carrying the first access information, wherein the network device parses the access information forwarding request to obtain the first access information and forwards the first access information to a second terminal device and the second terminal device detects whether the second terminal device acquires second third access information that matches the first access information and sends a correct detection result to the network device when the second terminal device is detected to acquire the second third-access information that matches the first access information, and the network device forwards the correct detection result to a smart device;
            receiving the correct detection result sent by the network device; and
            determining that the first access information is correct; and
        when the first access information is determined to be correct, send the first access information to a first terminal device to cause the first terminal device to utilize the first access information to access the wireless LAN.

6. The device of claim 5, wherein the processor is further configured to:

select one group of access information from an access information list stored in the device as the first access information.

7. The device of claim 5, wherein the processor is further configured to:
receive access information inputted by a user as the first access information.

\* \* \* \* \*